United States Patent
Allen et al.

(10) Patent No.: US 10,706,192 B1
(45) Date of Patent: Jul. 7, 2020

(54) VOLTAGE RECONCILIATION IN MULTI-LEVEL POWER MANAGED SYSTEMS

(71) Applicant: Synopsys, Inc., Mountain View, CA (US)

(72) Inventors: David L. Allen, Fremont, CA (US); Kaushik De, Pleasanton, CA (US)

(73) Assignee: Synopsys, Inc., Mountain View, CA (US)

( * ) Notice: Subject to any disclaimer, the term of this patent is extended or adjusted under 35 U.S.C. 154(b) by 146 days.

(21) Appl. No.: 15/941,176

(22) Filed: Mar. 30, 2018

Related U.S. Application Data

(60) Provisional application No. 62/492,834, filed on May 1, 2017.

(51) Int. Cl.
*G06F 30/33* (2020.01)
*G06F 30/327* (2020.01)
(Continued)

(52) U.S. Cl.
CPC ............ *G06F 30/33* (2020.01); *G06F 30/327* (2020.01); *G06F 30/398* (2020.01); *G06F 2119/06* (2020.01)

(58) Field of Classification Search
CPC ............ G06F 2217/12; G06F 2217/78; G06F 17/505; G06F 17/5022; G06F 17/5081; (Continued)

(56) References Cited

U.S. PATENT DOCUMENTS 8,516,422 B1   8/2013   Wang et al.
8,601,426 B1   12/2013  Du
(Continued)

OTHER PUBLICATIONS

Anusha, "An effective and efficient methodology for SoC power management through UPF", Indraprastha Institute of Information Technology (IIITD) New Delhi, p. 1-49, Jun. 2016.
(Continued)

*Primary Examiner* — Paul Dinh
(74) *Attorney, Agent, or Firm* — Bever, Hoffman & Harms, LLP

(57) ABSTRACT

A method and EDA software tool for analyzing and verifying that a multi-level power managed system description (IC design) is free of power-state combination conflicts by way of identifying and reconciling voltage level and power-state combination conflicts caused by reused blocks (IP cores). The reconciliation process involves generating Power-State Tables (PSTs) associated with each hierarchical circuit level (e.g., top/system level and lower/block levels) of the IC design using both initial power supply voltage values and reconciled/revised voltage values, which are determined by the main driver voltage levels of each power supply. Initial supply relationships generated using the initial PSTs are then compared with final supply relationships generated using the reconciled PSTs, whereby conflicts are identified when one or more initial supply relationship fails to match a final supply relationship, or when one or more final supply relationship fails to match an initial supply relationship.

14 Claims, 10 Drawing Sheets

(51) Int. Cl.
*G06F 30/398* (2020.01)
*G06F 119/06* (2020.01)

(58) Field of Classification Search
CPC ...... G06F 30/33; G06F 30/327; G06F 30/398; G06F 2219/06
USPC ........................................ 716/106, 109, 133
See application file for complete search history.

(56) References Cited

U.S. PATENT DOCUMENTS

| | | |
|---|---|---|
| 8,943,451 B2 | 12/2015 | Dwivedi et al. |
| 8,943,452 B2 | 12/2015 | Hsu et al. |
| 2015/0220678 A1* | 8/2015 | Srivastava .......... G06F 17/5081 716/109 |
| 2016/0292346 A1 | 10/2016 | Venkatesh et al. |
| 2017/0011138 A1* | 1/2017 | Venkatesh ............. G06F 17/505 |

OTHER PUBLICATIONS

Bhargava et al., "Power State to PST Conversion: Simplifying static analysis and debugging of power aware designs", Mentor Graphics Corp., Wilsonville, OR, 2016.

* cited by examiner

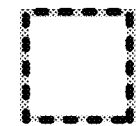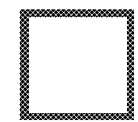
FIG. 4

ORIGINAL PSTS 602　　　　　　　　　　RECONCILED PSTS 604

ORIGINAL TOP PST 608

| | V1 | V3 | V4 |
|---|---|---|---|
| T1 | 1.3 | 1.5 | 1.2 |
| T2 | 1.4 | 1.5 | Off |

RELATIONSHIPS
1. V1 < V3
2. V1 > V4
3. V3 > V4
4. V4 -> V1: OFF2ON
5. V4 -> V3: OFF2ON

RECONCILED TOP PST 612

| | V1 | V3 | V4 |
|---|---|---|---|
| T1a | 1.3 | 1.5 | 1.5 |
| T1b | 1.3 | 1.5 | Off |
| T2a | 1.4 | 1.5 | 1.5 |
| T2b | 1.4 | 1.5 | Off |

RELATIONSHIPS
14. V1 < V3
15. V1 < V4
16. V4 -> V1: OFF2ON
17. V4 -> V3: OFF2ON

ORIGINAL UPPER PST 606

| | V1 | V2 | V3 | V4 |
|---|---|---|---|---|
| U1 | 1.1 | 1.1 | 1.1 | 1.1 |
| U2 | 1.1 | Off | 1.2 | 1.2 |
| U3 | 1.1 | 1.1 | 1.1 | Off |

RELATIONSHIPS
6. V1 < V3
7. V1 > V4
8. V2 -> V1: OFF2ON
9. V2 -> V3: OFF2ON
10. V2 -> V4: OFF2ON
11. V4 -> V1: OFF2ON
12. V4 -> V2: OFF2ON
13. V4 -> V3: OFF2ON

RECONCILED UPPER PST 610

| | V1 | V2 | V3 | V4 |
|---|---|---|---|---|
| U1a | 1.3 | 1.3 | 1.5 | 1.5 |
| U1b | 1.4 | 1.4 | 1.5 | 1.5 |
| U2a | 1.3 | Off | 1.5 | 1.5 |
| U2b | 1.4 | Off | 1.5 | 1.5 |
| U3a | 1.3 | 1.3 | 1.5 | Off |
| U3b | 1.4 | 1.4 | 1.5 | Off |

RELATIONSHIPS
18. V1 < V3
19. V1 < V4
20. V2 < V3
21. V2 < V4
22. V2 -> V1: OFF2ON
23. V2 -> V3: OFF2ON
24. V2 -> V4: OFF2ON
25. V4 -> V1: OFF2ON
26. V4 -> V2: OFF2ON
27. V4 -> V3: OFF2ON

FIG. 6

VOLTAGE RECONCILIATION IN MULTI-LEVEL POWER MANAGED SYSTEMS

RELATED APPLICATION

This application claims priority from U.S. Provisional Patent Application 62/492,834, entitled "VOLTAGE RECONCILIATION IN MULTI-LEVEL POWER MANAGED SYSTEMS", which was filed on May 1, 2017, and is incorporated by reference herein.

FIELD OF THE INVENTION

The present invention generally relates to integrated circuit (IC) devices, and more particularly to IC devices that include multi-level power managed systems.

BACKGROUND OF THE INVENTION

Due to the ever-increasing complexity of new IC devices, Electronic Design Automation (EDA) software tools are now considered essential in the process of converting each new electronic system idea into a corresponding physical integrated circuit (IC) device ("chip"). That is, IC designers utilize EDA tools to develop an initial IC design (i.e., software description) that they believe is capable of implementing a new electronic system idea, to analyze and modify the initial IC design in order to verify that the final IC design performs the operational objectives set for the electronic system idea, and then to generate and check a series of IC layouts (aka mask designs or mask layouts) that define a physical IC chip capable of implementing the final IC design. Because modern IC devices, such as System-on-Chip (SoC) devices, can comprise billions of individual circuit components, there is no practical way to develop and produce modern IC devices without the use of EDA tools.

To further speed up IC development, IC designers typically utilize blocks to implement standard circuit functions. As used herein, the term "block" (aka Intellectual Property (IP) core) refers to a unit of IC layout that is configured to perform a particular circuit function (e.g., a memory array having a certain capacity and speed, an adder, or a particular type of microprocessor) that is commonly utilized in modern SoC designs. EDA tools typically facilitate the re-use of blocks during IC development by way of providing libraries from which selected blocks may be retrieved and placed into a new IC design. In addition, each block includes various types of circuit and layout description information that are utilized during subsequent simulation, static verification, synthesis, and place-and-route operations performed by the EDA tool. In effect, the re-use of previously developed blocks saves IC development time by way of providing a "known-good" (i.e., pre-tested) circuit/layout design that is capable of implementing a required circuitry function, whereby the IC designer avoids the time-consuming process of developing a new circuit from scratch, thereby increasing profitability by reducing the amount of time and resources required to complete and fabricate each new IC design.

Although the reuse of a selected block in a new IC design provides the benefits set forth above, a problem can arise during the design of multi-level power managed systems when power-state combinations required by a new IC design conflict with power-state combinations associated with the selected block. That is, in addition to IC layout information, each block typically includes a Unified Power Format (UPF) design language file that describes certain combinations of power supply voltage levels (or "off") for which the block's circuit was designed to operate properly. During IC development, an IC designer typically generates top-level IC design descriptions into which blocks are incorporated, and specifies associated top-level power-state combinations that are stored in a top-level UPF design file. One type of power-state combination conflict includes voltage level conflicts that occur when blocks developed for high-power IC devices (e.g., devices developed for 1.5V supplies) are reused in lower-power IC designs (e.g., devices developed for 1.2V supplies), whereby the upper voltage levels listed in the block-level UPF design file are typically different than those provided in the top-level UPF design file. The conflicting power-state combination problem can also arise when an IC designer specifies certain power-state combinations in top-level UPF design file that conflict with the block-level power-state combinations. EDA tools typically address the conflicting power-state combination problem by retaining only overlapping power-state combinations (i.e., power-state combinations that are present in the UPF design files of both the blocks and the top-level IC design description), and by removing (deleting) all inconsistent power-state combinations from the block and top-level UPF design files. This automated process often leads to the undesirable elimination of required power-state combinations included in the top-level IC design description because they are inconsistent with the block-level power-state combinations, which can lead to improper operation of the IC device fabricated using the modified IC design description. Moreover, it is not always immediately obvious that required power-state combinations have been eliminated by an EDA tool. Once an IC designer realizes that required power-state combinations have been eliminated, the only current solution is for the IC designer to manually change the reused block (IP core) design files, which is incompatible with the concept of reusing the blocks. Moreover, manual modification of the blocks is risky because the changes may not satisfy the IC design, and the modified block may require unexpected additional changes to adapt to the new voltages.

What is needed is an automated method for addressing the above-mentioned conflicting power-state combination problem as early as possible during the development of multi-level power managed IC systems. That is, what is needed is an EDA tool that is configured to identify and address conflicting power-state combinations in multi-level power managed IC designs (i.e., software-based descriptions) in a way that avoids the undesirable elimination of critical power-state information. What is particularly needed is an EDA tool that automatically resolves conflicting power-state combinations that are compatible (fixable), and notifies the IC designer about each incompatible conflict so that every conflict can be resolved before further development is performed.

SUMMARY OF THE INVENTION

The present disclosure is directed to a method for analyzing and verifying that the IC design (circuit description) of a multi-level power managed system is free of power-state combination conflicts by way of identifying and/or automatically reconciling voltage level and power-state combination conflicts that sometimes arise when blocks (IP cores) are reused during the design of new multi-level power managed systems. The method implements a reconciliation process in which Power-State Tables (PSTs) associated with each hierarchical circuit level description (e.g., a top/system level and one or more lower/block levels) of the multi-level power managed system description are analyzed by comparing initial power supply voltage values with reconciled/revised voltage values, where the reconciled voltage values are generating by referencing the main driver of each power supply. The reconciliation process serves to identify and facilitate systematic correction of voltage level conflicts and compatible (i.e., automatically fixable) power-state combination conflicts, thereby avoiding the need for conventional time-consuming and unreliable manual correction approaches. When voltage level or power-state combination conflicts are encountered that cannot be resolved using automatic correction methods, these incompatible conflicts are specifically flagged in a way that allows both lower/block-level and top/system-level designers to generate a coordinated solution in an efficient and reliable manner. Accordingly, the present disclosure facilitates the reliable generation of finalized multi-level power managed system descriptions (final IC designs) using a minimum amount of design and processing time, thereby minimizing total manufacturing costs associated with the development of physical IC devices (chips) that are fabricated in accordance with the final IC designs.

According to a practical embodiment, the novel method is executed inside an otherwise-standard electronic design automation (EDA) tool that is configured to perform conventional EDA operations such as simulation, static verification, synthesis, and place-and-route during the development of a multi-level power managed system based on an associated IC design. Currently, an IC design for a multi-level power managed system is typically described in a hierarchical arrangement including a top-level circuit description and multiple lower-level (e.g., intermediate-level or block-level) circuit descriptions. The methodology of the present invention is implemented while performing one or more of the EDA operations (e.g., during logic design/function verification and/or during netlist verification) that are performed before a subsequent EDA function during which Unified Power Format (UPF) design file processing is executed. According to an aspect of the present invention, the power state reconciliation method is configured to perform the entire verification process without requiring modification to conventional EDA tools by way of utilizing top-level circuit descriptions and lower-level circuit descriptions in forms currently used by the conventional EDA tools, thereby avoiding costly and time-consuming modifications to existing EDA tools.

In one embodiment, the method begins by reading initial versions of the UPF design files from the top-level and lower/block-level circuit descriptions, and then utilizes known techniques to generate a set of original (initial) PSTs based on the read-in UPF design file data (i.e., one original top-level PST and one or more original lower/block-level PSTs). Sets of initial supply relationships are then determined for all of the original PSTs based on stored power state information (entries) included in each original PST, where the stored power state information for a given circuit level (e.g., lower/block-level) includes every different combination of power supply voltage value/state (i.e., either off state (0V) or operating voltage level) entered during normal operation of the given circuit level. The sets of supply relationships are determined by comparing pairs of power supplies in each of the power state entries, and generating a corresponding initial supply relationship including either a higher/lower voltage level relationship (e.g., V1<V3) or an on-off transition relationship (e.g., V4→V3 OFF2ON), where each supply relationship is determined by comparing the stored voltage levels for each pair of power supply voltage levels in a given power state entry. After the initial supply relationships are generated, reconciled PSTs are generated by way of reconciling the voltage levels stored in the original PSTs for each given power supply such that all voltage levels are reconciled to primary voltage level(s) generated by a main driver of each given power supply. The reconciliation process may involve expansion of the original PSTs when multiple primary voltage levels are provided. An optional step of removing any duplicate power state entries that may be generated during the reconciliation process may be performed to minimize subsequent processing. Sets of final supply relationships are then determined based on the revised operating power state voltage value information included in each reconciled PST using the methodology described above during generation of the initial supply relationships. The initial supply relationships are then compared with the final supply relationships for each original/reconciled PST to verify that each initial supply relationship has a matching final supply relationship, and that each final supply relationship has a matching initial supply relationship (e.g., when both the initial and final supply relationships include corresponding relationships V1<V3, then the corresponding relationships match). The existence of any unmatched initial or final supply relationships signals a problem with the current circuit design that may require a change to the top-level and/or lower/block-level circuit descriptions. For example, when a final supply relationship does not have a matching initial supply relationship, this signals an electrical error problem that will cause an electrical failure if not corrected. Alternatively, when an initial supply relationship does not have a matching final supply relationship, this signals an inefficiency problem that may be produced by a protection (e.g., a level shifter or isolation circuit) existing in the lower/block-level circuit description that is no longer needed. In this case the circuit description will still work without errors, but because the protection is not needed, the protection unnecessarily wastes valuable chip area, and may produce unnecessary delays and power consumption, and therefore should be removed if possible. When either of the electrical error or inefficiency problems are detected during comparison of the initial and final supply relationships, a report is generated specifying the associated power state combination conflicts, whereby an IC designer is provided the opportunity to take appropriate corrective action (i.e., to modify the circuit design as needed to remove the conflict) before further processing is performed by the EDA tool. Verification is achieved when the power state reconciliation method generates zero power state combination conflicts, indicating that the multi-level power managed system description is ready for subsequent EDA operations. As mentioned above, other than modifications needed to include the power state reconciliation methodology described above, no additional changes to an otherwise-standard EDA tool are required (e.g., all subsequently performed UPF design file processing functions do not require modification to use the reconciliation process results), which greatly reduces the time and cost required for EDA tool providers to implement the present invention.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates an exemplary embodiment in which final supply relationships are extracted from reconciled PSTs for comparison in accordance with the power state reconciliation method.

FIG. 6 illustrates another exemplary embodiment depicting supply relationships that are generated for comparison by the power state reconciliation method.

DETAILED DESCRIPTION

Figure 1:
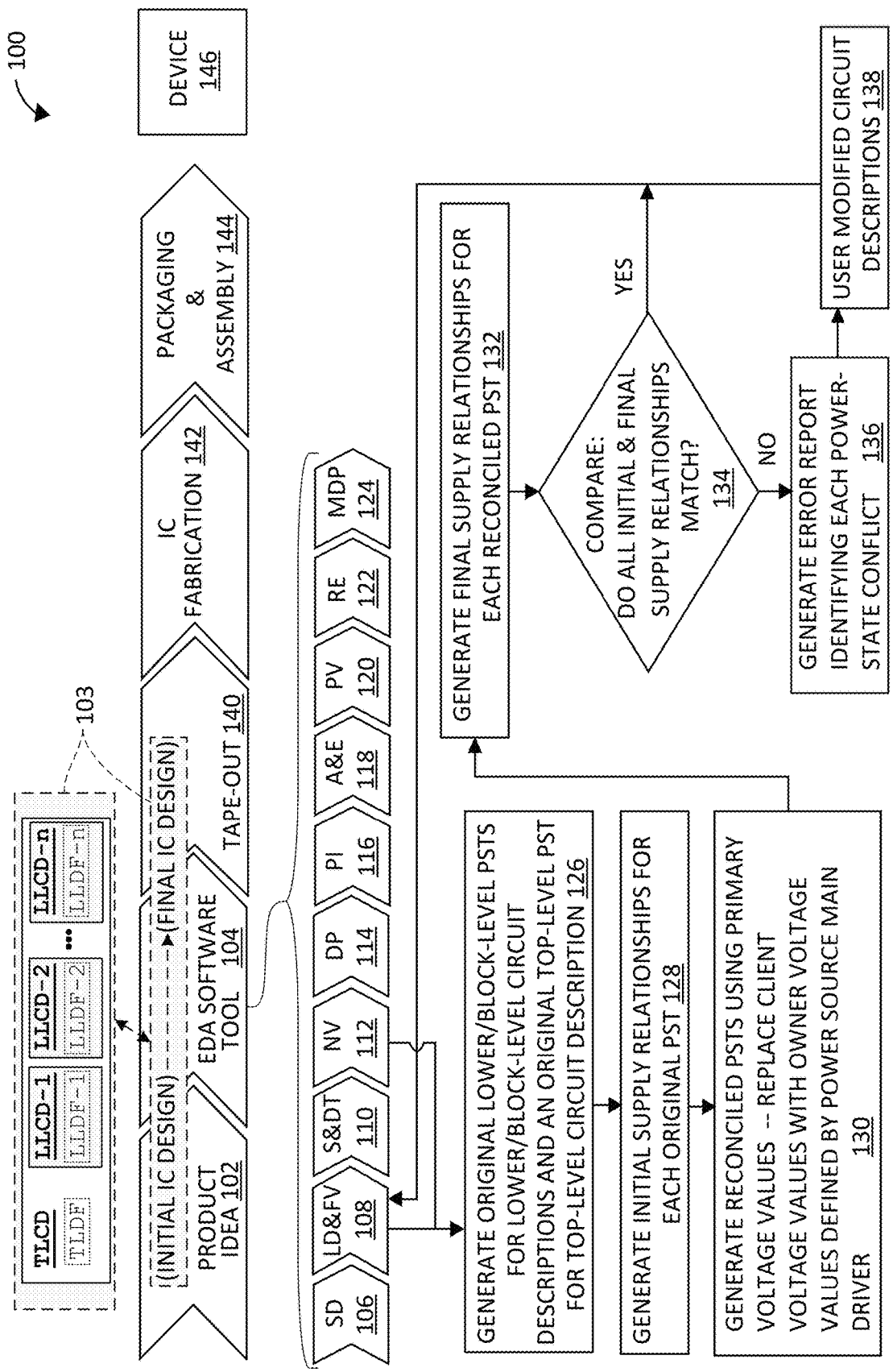
FIG. 1 illustrates an embodiment of a digital IC design process flow that utilizes a power state reconciliation method according to an embodiment of the present invention.

The present invention relates to an improved power state reconciliation method for verifying a multi-level power managed system description before the production of an integrated circuit device based on the system description. As used herein, the following terms and phrases are to be accorded the indicated meaning in the context of the present application:

"Block" in this context refers to an IP core (see the definition for Intellectual Property (IP) core).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Model" in this context refers to the logic (e.g., algorithms and equations) that represent the behavior of the system being modeled. Computer simulation is the actual execution of logic comprising the logic describing the modeled system. Simulation, therefore, is the process of executing a model.

"Firmware" in this context refers to software logic embodied as processor-executable instructions stored in read-only memories or media.

"Intellectual Property core" or "IP core" in this context refers to refers to a unit of integrated circuit layout that is configured to perform a particular circuit function (e.g., a memory array having a certain capacity and speed, an adder, or a particular type of microprocessor) that is commonly utilized in modern System-on-Chip designs. When describing one or more IP cores, a first IP core may be designated as IPA (or IPa), a second IP core may be designated as IPB (or IPb), etc.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Power state" in this context refers to the voltage value that a supply port, supply set, or power domain may take. In other words, power state defines the actual operating voltages of a device, such as a chip.

"Power state table (PST)" in this context refers to is an array of power states entered during operation of an associated circuit or circuit portion. For example, if a circuit utilizes two power supplies V1 and V2, where V1 remains 1V during all operations and V2 is 1.5V for some operations and 2V for other operations, then an associated power state table would include two states: the first state would include V1=1V and V2=1.5V, and the second state would include V1=1V and V2=2V.

"Software" in this context refers to logic implemented as processor-executable instructions in a machine memory (e.g. read/write volatile or nonvolatile memory or media).

"Unified Power Format (UPF)" in this context refers to is an Institute of Electrical and Electronics Engineers (IEEE) standard for specifying power intent in power optimization of electronic design automation.

FIG. 1 depicts a simplified representation of an exemplary digital IC design process flow 100 that utilizes the power state reconciliation method of the present invention during the production (i.e., development and subsequent fabrication) of a physical IC device 146 operably configured to implement a desired multi-level power managed system. Referring to the upper portion of FIG. 1, at a high level the digital IC design process flow 100 starts with a product idea 102 that is realized as an initial IC design 103 (i.e., a Verilog or other software-based circuit description of the desired multi-level power managed system) during a design phase of the production process, which is performed at least partially using electronic-design-automation (EDA) software tool 104. EDA software tool 104 also functions to verify and modify the initial IC design 103 until a final version is generated that satisfies all design parameters, and in some embodiments the EDA software tool 104 produces a layout description based on the final IC design 103. The layout description generated by EDA software tool 104 (or a tape-out generated by a separate tape-out tool 140), which is based on the final IC design 103, is then utilized by a fabrication facility during a photolithographic fabrication process 142 to generate a physical IC on a wafer. After wafer fabrication, the wafer undergoes dicing, packaging and assembly using suitable packaging and assembly tools 144 according to known techniques, resulting in finished IC device 146.

As indicated in the middle portion of FIG. 1, in one embodiment the sequential design process operations (design flow) performed by EDA software tool 104 include system design 106, logic design and functional verification 108, synthesis and design for test 110, netlist verification 112, design planning 114, physical implementation 116, analysis and extraction 118, a physical verification 120, resolution enhancement 122, and mask-data preparation 124, which are described below. The design flow including operations 106 to 124 is provided for illustration purposes only, and is not meant to limit the present disclosure. For example, an actual integrated circuit design may require a designer to perform the operations in a different sequence than the sequence described herein.

Referring to the left end of design flow (FIG. 1), during system design (SD) operation 106, designers describe the functionality that they want to implement, they can perform what-if planning to refine functionality, check costs, etc. Hardware-software architecture partitioning can occur at this stage. Exemplary EDA software products from Synopsys, Inc. that can be used at this step include Model Architect™, Saber™, System Studio™, and DesignWare® products.

During logic design and functional verification (LD&FV) operation 108, VHDL or Verilog code for modules in the system is written and the design is checked for functional accuracy. More specifically, does the design as checked to ensure that produces the correct outputs. Exemplary EDA software products from Synopsys, Inc. that can be used at this step include HSIM®, NanoSim®, CustomSim™, VCS®, VERA®, DesignWare®, Magellan™, Formality®, ESP™ and LEDA® products.

During the synthesis and design for test (S&DT) operation 110, VHDL/Verilog is translated to a netlist. This netlist may be optimized for the target technology. Additionally, tests can be designed and implemented to check the finished chips. Exemplary EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification (NV) operation 112, the netlist is checked for compliance with timing constraints and for correspondence with the VHDL/Verilog source code. Exemplary EDA software products from Synopsys, Inc. of Mountain View, Calif. that can be used at this stage include: Formality®, Primetime®, and VCS® products.

During design planning (DP) operation 114, an overall floor plan for the chip is constructed and analyzed for timing and top-level routing. Exemplary EDA software products from Synopsys, Inc. of Mountain View, Calif. that can be used at this stage include: Astro® and IC Compiler® and IC Compiler II products.

During physical implementation (PI) operation 116, the placement (positioning of circuit elements) and routing (connection of the same) occurs. Exemplary EDA software products from Synopsys, Inc. of Mountain View, Calif. that can be used at this stage include: the Astro® and IC Compiler® products.

During analysis and extraction (A&E) operation 118, the circuit function is verified at a transistor level, which permits refinement. Exemplary EDA software products from Synopsys, Inc. of Mountain View, Calif. that can be used at this stage include: Primerail®, Primetime®, and Star RC/XT® products.

During physical verification (PV) operation 120, the design is checked to ensure correctness for: manufacturing, electrical issues, lithographic issues, and circuitry. Exemplary EDA software products from Synopsys, Inc. of Mountain View, Calif. that can be used at this stage include the IC Validator product.

During resolution enhancement (RE) operation 122, geometric manipulations of the layout are performed to improve manufacturability of the design. Exemplary EDA software products from Synopsys, Inc. of Mountain View, Calif. that can be used at this stage include: Proteus™, ProteusAF™, and PSMGen™ products.

During mask-data preparation (MDP) operation 124, tape-out data for production of masks to produce finished chips is provided. Exemplary EDA software products from Synopsys, Inc. of Mountain View, Calif. that can be used at this stage include the CATS® family of products.

According to a practical embodiment, the present disclosure operates inside an otherwise-standard EDA software tool 104 that is configured to perform the operations and described above during the development of multi-level power managed system IC design 103. Referring again to FIG. 1, the present disclosure is implemented while performing one or more of the EDA tool operations (e.g., during logic design and functional verification operation 108 and/or during netlist verification operation 112), and, more specifically, before UPF design file processing is performed in accordance with conventional EDA processing, which typically occurs during or after design planning (DP) operations 114.

An exemplary simplified IC design (multi-level power managed system description) 103 is depicted in graphical form at the top of FIG. 1. During the relevant EDA tool operations, IC design 103 is typically described using an hierarchical arrangement including a top-level circuit description TLCD and multiple lower-level (e.g., intermediate- or block-level) circuit descriptions LLCD-1 to LLCD-n, which are collectively referred to herein as "LLCD-x". Top level circuit description TLCD includes a top-level UPF design file TLDF containing (first) power states utilized by top-level circuit description TLCD. Each lower/block-level circuit descriptions LLCD-1 to LLCD-n includes a corresponding lower-level UPF design file LLDF-1 to LLDF-n identifying (second) power states utilized by the associated lower/block-level circuit description LLCD-x. Those skilled in the art will recognize that the description of IC design 103 is greatly simplified for brevity.

The power state reconciliation method of the present invention processes initial or intermediate versions of IC design 103 before the production of an integrated circuit device 146 based on a final (verified) version of IC design 103. As indicated near the top of FIG. 1 by the dashed-line block extending from process block 102 to process block 140, an initial version of IC design 103 (INITIAL IC DESIGN) is generated during the early development (product idea) stage and passed to modified EDA tool 104 for processing. During EDA processing, as depicted by the dashed lined arrow pointing away from INITIAL IC DESIGN, IC design 103 may be modified one or more times in accordance with the power state reconciliation method using the techniques described below. When the power state reconciliation method verifies that the initial (or a modified "intermediate") IC design is free of power state combination conflicts, then this final (error-free) version of IC design 103

(FINAL IC DESIGN) is passed to tape-out tool 140. Of course, the final version of IC design 103 would also have passed all other tests performed by EDA software tool 104, but these additional tests are omitted herein for brevity.

At the beginning of EDA processing using modified EDA software tool 104, relevant portions of initial/intermediate IC design 103 (i.e., both top-level circuit description TLCD and lower/block level descriptions LLCD-x) are into respective internal data structures (e.g., power state tables) using known techniques. As understood by those skilled in the art, these data structures are also utilized to perform other EDA operations including UPF design file processing. In one embodiment, the power state reconciliation methodology of the present disclosure is performed using the same internal data structures that are utilized by these other EDA operations, thereby facilitating seamless integration into existing EDA tools by way of avoiding the need for costly data conversions that would be required implement a data tool incapable of utilizing these internal data structures.

As explained in detail below, the methodology performs reconciliation of voltage values under certain power state conditions that may be used to provide final supply relationships during subsequent EDA operations, and if needed, the methodology produces reports/messages configured to inform the designer of any incompatible power states that require manual reconciliation. After the designer/user has entered all required corrections and the methodology performs a final "error-free" reconciliation process, the subsequent EDA operations are performed using the revised reconciled data structures. In this way, the methodology analyzes and verifies that IC design 103 is free of power state combination conflicts by way of identifying and/or automatically reconciling voltage level and power state combination conflicts that sometimes arise when blocks (IP cores) are reused during the design of new multi-level power managed systems. An advantage provided by the methodology disclosed herein is that all reconciliation is performed before subsequent EDA operations (e.g., UPF design file processing) are implemented, whereby the methodology of the present disclosure obviates the need to modify the one or more EDA software tool elements that perform the subsequent EDA operations. That is, the present disclosure minimizes changes to an otherwise-standard EDA software tool by way of reading IC designs in a conventional form (i.e., such that no change is required in otherwise-standard "upstream" EDA operations/tools, such as a system design tool), and by generating reconciled data structures in an otherwise conventional form that can be received by and processed during subsequent EDA operations (e.g., such that no change is required in otherwise-standard "downstream" EDA operations/tools, such as design planning (DP) tool).

The power state reconciliation methodology of the present disclosure is generally described below with reference to blocks 126 to 138, which appear in the lower portion of FIG. 1. As indicated by the arrows leading to and from blocks 126 to 138, the power state reconciliation methodology begins by reading in IC design 103 during logic design and functional verification operation (block 108) or netlist verification operation (block 112), and control is returned to logic design and functional verification operation (block 108) in cases where additional modifications to IC design 103 may be required.

Referring to block 126, the method begins by generating initial (original) Power State Table (PSTs) using power state information provided in current (initial) UPF design files of IC design 103, where each original PST includes power state entries comprising associated unique sets of power supply voltage level values (i.e., either on-state voltage values such as 1.2V, or an an off-state indicator value) that occur during a corresponding power state. In the exemplary embodiment, generating the original PSTs includes generating an original top-level PST using initial top-level UPF design file TLDF, and generating one original lower/block-level PST for each lower/block-level circuit descriptions LLCD-1 to LLCD-n. The original top-level PST is generated such that it includes a (first) power state entry for each different power state utilized by the top-level circuit description (i.e., initial top-level UPF design file TLDF), where each (first) power state entry including an associated set of power supply voltage level values generated by associated power supplies during the corresponding power state. Similarly, each lower/block-level PST is generated using stored data of an associated initial lower-level UPF design file (e.g., LLCD-1), and includes (second) power state entries having associated sets of power state voltage level values generated by associated power supplies during a corresponding (second) power state utilized by the associated lower-level circuit description. Note that each IP core (reused block) is by definition a block-level circuit description, and thus one lower/block-level PST is generated for each IP core. Accordingly, each original PST includes all power states and associated voltage levels required from each power supply utilized within the associated circuit description portion, and forms the primary input to the power state reconciliation methodology. For example, the original top-level PST for the top-level circuit description includes all power states and associated voltage levels that occur for every power supply utilized within the top-level circuit description, including those that occur within any lower-block level circuit descriptions that may be included in the top-level circuit description. In contrast, each original lower/block level PST only includes power states and associated voltage levels for only the power supplies that are utilized within that PST's associated lower/block level circuit description. When said lower/block-level circuit description comprises an IP core (reused block), then the lower/block level PST includes stored power states and associated voltages (i.e., power states and associated voltages that were pre-calculated or generated during previous applications and provided with the IP core).

Additional input data indicating power supply origination is also optionally extracted from the UPF design files during generation of the original PSTs, which is utilized to determine whether a given power supply is an owner (main driver) power supply (i.e., originates in the associated circuit description) or is a client power supply (i.e., originates in a neighboring circuit but is utilized by the subject circuit). For example, when the main driver of a power supply V1 occurs in top-level circuit description TLCD, then power supply V1 is designated as a main driver source in the top-level PST, and designated as a client power supply in each lower/block level PST that utilizes power supply V1. In other embodiments this additional input data may be accessed later at any time before reconciliation (described below).

Referring to block 128 (FIG. 1), initial supply relationships are then determined for all of the original PSTs based on stored power state voltage value information included in the power state entries of each original PST. Specifically, initial supply relationships (i.e., either voltage level comparisons such as "V1<V3", or on/off comparisons such as "V4→V3 OFF2ON" are generated for each pair of power supply voltage level values occurring in each power state entry of the original PSTs. For example, assuming a given lower/block level circuit description utilizes four power supplies (e.g., V1, V2, V3 and V4) and enters three operating state combinations of these four power supplies during normal operation (e.g., V1=1.1V, V2=1.1V, V3=1.2V, V4=1.2V in the first state, V1=1.1V, V2=off, V3=1.2V, V4=1.2V in the second state, and V1=1.1V, V2=1.1V, V3=1.1V, V4=off in the third state), the original PST for that lower/block-level circuit description would include three power state entries arbitrarily designated U1, U2 and U3, where each power state entry lists one of the three different combinations of associated voltage levels (e.g., power state entry U1: V1=1.1V, V2=1.1V, V3=1.2V, V4=1.2V; power state entry U2: V1=1.1V, V2=off, V3=1.2V, V4=1.2V; power state entry U3: V1=1.1V, V2=1.1V, V3=1.1V, V4=off). In this example the generation of initial supply relationships involves comparing pairs of power supply voltage level values in each power state entry U1 to U3, and generating a corresponding initial supply relationship including one of a higher/lower voltage level relationship and an on-off transition relationship that is determined by comparing the stored voltage level values for each compared pair of power supply voltage level values. For example, higher/lower voltage level supply relationships for power state entry U1 in the above example would include V1=V2, V1<V3, V1<V4, V2<V3, V2<V4 and V3=V4, with additional higher/lower voltage level supply relationships being generated for each pair of on-state power supply voltage values in power state entries U2 and U3. In contrast, on-off transition supply relationships are generated in power state U2 for comparisons between off-state power supply V2 and on-state power supplies V1, V3 and V4, where exemplary on-off transition supply relationships include "V1→V2 ON2OFF" (i.e., V1 is ON, V2 is OFF), "V2→V3 OFF2ON" (i.e., V2 is OFF, V3 is ON), and "V2→V4 OFF2ON". Similar on-off transition supply relationships are generated in power state U3 for comparisons between off-state power supply V4 and on-state power supplies V1, V2 and V3. These initial supply relationships are stored (saved in memory) for comparison with final supply relationships that are generated after reconciliation, and explained below.

Referring to block 130 (FIG. 1), after the initial supply relationships are generated, reconciled (revised) PSTs are generated by way of reconciling the voltage levels stored in the original PSTs for each given power supply such that all voltage levels are reconciled to primary voltage level(s) generated by a main driver of each given power supply. For example, when a given power supply V1 is utilized both by a top-level circuit description and a lower/block-level circuit description and the top-level circuit description includes the main driver circuit of power supply V1, then the stored V1 voltage level(s) stored in the reconciled PST associated with the lower/block level circuit description are revised to equal the V1 voltage level(s) stored in the original PST associated with the lower/block level circuit description. The reconciliation process may involve expansion of the original PSTs when multiple primary voltage levels are provided for a main driver power supply (e.g., when power supply V1 includes two primary voltage levels 1.3V and 1.4V, then a corresponding reconciled PST is expanded to include a first set of power state entries in which power supply V1 has a 1.3V voltage level, and a second set of power state entries in which power supply V1 has a 1.4V level). When PST expansion is performed in this manner, an optional step of comparing the resulting power state entries and removing (deleting) any duplicates that may have been generated during expansion is performed to minimize subsequent processing. A benefit of the power state reconciliation methodology is that the reconciled PSTs, which are automatically generated during the reconciliation process, prevent the elimination of new voltages required by the system designer, which in turn avoids the need for manual changes to the reused block design files.

Referring to block 132, sets of final supply relationships are then determined/generated (extracted) based on the revised operating state information included in each reconciled PST. The generation of final supply relationships involves using the same methodology used during generation of the initial supply relationships, which is described above with reference to block 128. That is, for the reconciled top-level PST, (first) final higher/lower voltage level relationships are generated by comparing the same on-state power supply voltage levels in each power state entry that were compared in generating the initial supply relationships. Similarly, for each reconciled lower/block-level PST, (second) final higher/lower voltage level relationships are generated by comparing the same on-state power supply voltage levels in each power state entry that were compared in generating the initial supply relationships for the corresponding initial lower/block-level PST. Note that some reconciled (revised) voltage level values stored the reconciled PSTs (which are generated as described above with reference to block 130) are typically different from the corresponding voltage values stored in the initial PSTs (which are generated as described above with reference to block 128), whereby an initial higher/lower voltage level relationship (e.g., V1<V3) between two power supplies may be different from its corresponding final higher/lower voltage level relationship (e.g., V1>V3). For similar reasons, an initial on/off transition relationship between two power supplies may be different from a corresponding final on/off transition relationship.

As explained below, the generation of final supply relationships facilitates detecting problematic supply relationship differences between the voltage values of the reconciled PSTs and those of the initial supply relationships.

Referring to block 134, the initial supply relationships generated in block 128 are then compared with the final supply relationships generated in block 132 for each original/reconciled PST to verify that each initial supply relationship has a matching final supply relationship, and that each final supply relationship has a matching initial supply relationship. For example, when both an initial and final supply relationships include corresponding relationships V1<V3, then the corresponding relationships match. Conversely, if an initial supply relationship has a V1<V3 relationship value and the corresponding final supply relationship has a V1>V3 relationship value, then an error (mismatch) is detected.

Referring to block 136, when one or more unmatched supply relationships are detected, an error report specifying the associated power-state combination conflict is generated in a way that notifies an operator by way of a suitable interface. That is, the existence of any unmatched initial or final supply relationships signals a problem with the current circuit design that may require a change to the top-level and/or lower/block-level circuit descriptions. For example, when a final supply relationship does not have a matching initial supply relationship, this signals an electrical error problem that will cause an electrical failure if not corrected. Alternatively, when an initial supply relationship does not have a matching final supply relationship, this signals an inefficiency problem that may be produced by a protection (e.g., a level shifter or isolation) existing in the lower/block-level circuit description that is no longer needed. In this case the circuit description will still work without errors, but because the protection is not needed, the protection unnecessarily wastes valuable chip area, and may produce unnecessary delays and power consumption, and therefore should be removed if possible. When either of the electrical errors or inefficiency problems are detected during comparison of the initial and final supply relationships, a message or other error report is generated specifying the associated power-state combination conflict.

Referring to block 138 in FIG. 1, an IC designer is provided the opportunity to take appropriate corrective action (i.e., to modify the circuit design as needed to remove the conflict) before further processing is performed by the EDA tool. Note that the IC designer's efforts are made significantly easier by way of generating an error report that specifies the associated power-state combination conflict in a way that makes corrective action intuitive and efficient. Once corrective action is completed in block 138, the revised IC design 103 is re-submitted to the EDA tool (e.g., at block 108, as indicated in FIG. 1), and the power state reconciliation methodology is repeated for the revised IC design. The process of revising the IC design and performing the power state reconciliation methodology is repeated until no (i.e., zero) power-state combination conflicts are detected, whereby the IC design is verified and ready for subsequent EDA processing. Another benefit of the present disclosure is that, other than modifications needed to include the power state reconciliation methodology described above, no additional changes to the EDA tool are required (e.g., all subsequently performed UPF design file processing functions do not require modification to use the reconciliation process results), which greatly reduces the time and cost required for EDA tool providers to implement the present disclosure. In summary, the power state reconciliation methodology utilizes the PST information generated from the lower/block and top level circuit descriptions to update voltage values in memory, and flag any power states where the design may not operate properly. The downstream EDA functions do not need to be aware of reconciliation. This avoids the problem of designers attempting to manually update the voltages, and either introducing errors or overlooking errors that may cause the design to operate improperly.

Figure 2:
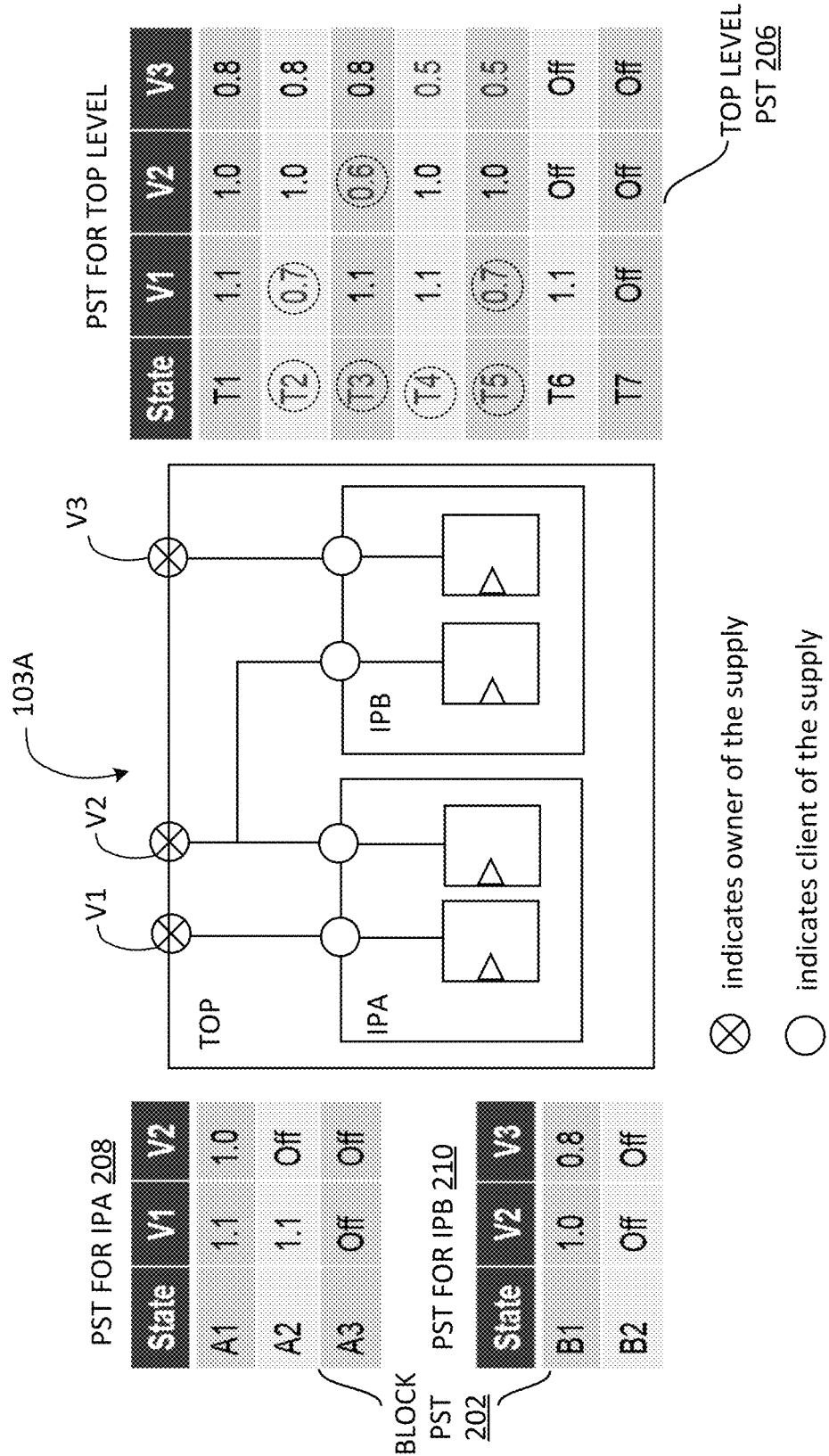
FIG. 2 illustrates an embodiment of block level PSTs formed and initial supply relationship generation in accordance with an exemplary embodiment of the power state reconciliation method.

FIG. 2 depicts a simplified IC design 103A and an example of several initial PSTs generated in accordance with block 126 (FIG. 1). Simplified IC design 103A includes a top-level circuit description TOP and two lower/block-level circuit descriptions IPA and IPB. Note that power supplies V1, V2 and V3 are "owned" by (i.e., the driver circuit for these power sources resides in) top-level circuit description TOP. According to block 126, top-level PST 206 is generated for top-level circuit description TOP, which enters seven different operating states T1 to T7 using three power supplies V1 to V3 during operation (the various voltage values listed in FIG. 2 will be explained below). In addition, two lower/block-level PSTs 202 are generated for lower/block-level circuit descriptions IPA and IPB, respectively. In this example, lower/block-level PST 208, which is generated for lower/block-level circuit description IPA, includes three operating states A1 to A3 using power supplies V1 and V2, and lower/block-level PST 210, which is generated for lower/block-level circuit description IPB, includes two operating states B1 and B2 using power supplies V2 and V3. Notice that several states have voltages (indicated by dashed-line circles) where the IP PST has no such voltage. The definition of the UPF language states that if a power state in any PST declares a voltage which is not legal for any connected supply, then the power state is deleted. So, at the top level, all of the states T2, T3, T4, T5 indicated by dashed-line circles are deleted by conventional UPF processing methods. This does not match the requirement of the top level designer, and creates a design problem. The power state reconciliation methodology of the present invention serves to identify these conflicts and, in some instances, provide an acceptable correction that avoids deletion during subsequent UPF processing. In this example, one hierarchy level (usually the top level PST 206) is marked as the "owner" for power supplies V1 to V3. The voltage levels of the owner (main driver) source take priority over corresponding voltage levels of any other block PST 202 (or top level PST 206) that utilizes the power supply as a client source (or client supply). As used in the figures and shown in FIG. 2, a crossed circuit indicates main driver (owner) sources, and an open circle indicates a client source. As explained above with reference to block 130, the above-mentioned conflict issue is avoided by way of replacing voltage values of client sources with main supply voltage values during the reconciliation process.

Figure 3:
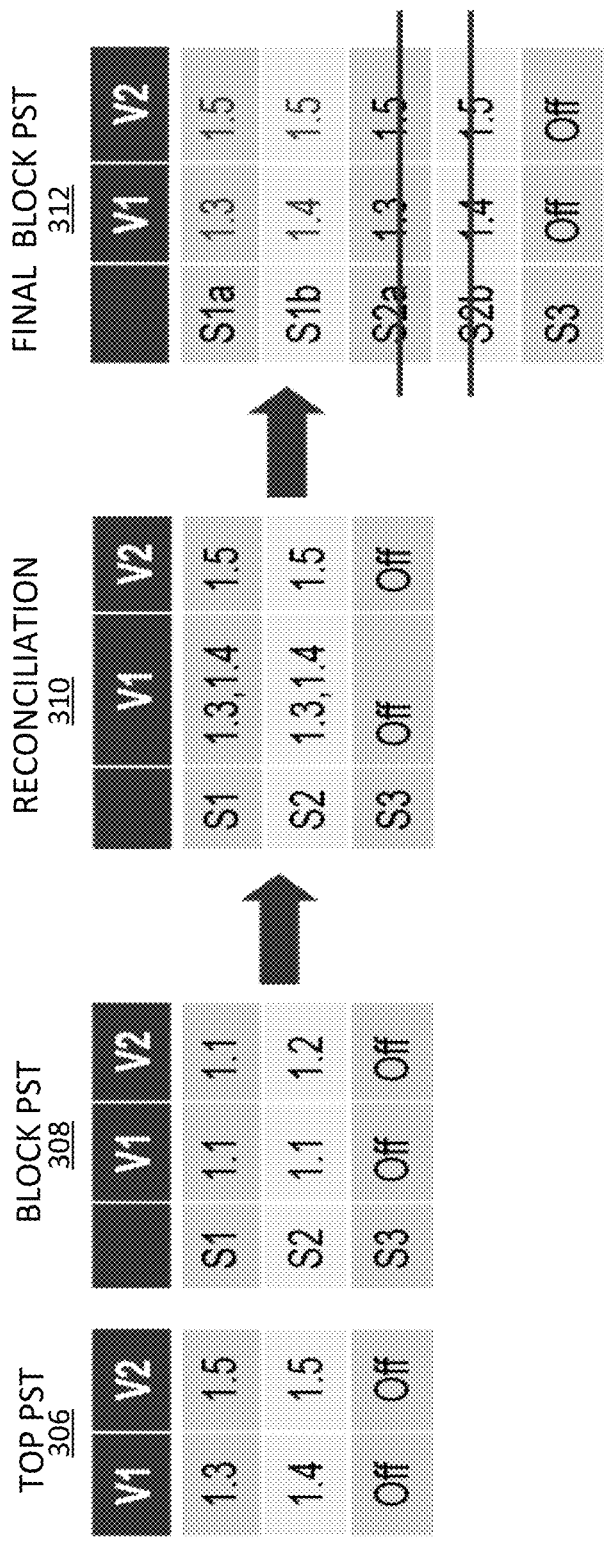
FIG. 3 illustrates an exemplary embodiment showing a reconciled PST generation process utilized in the power state reconciliation method reconciliation.

FIG. 3 depicts an exemplary reconciliation process performed in accordance with block 130 (FIG. 1) for a top-level PST 306 and an initial block-level PST 308. For clarity, both PSTs include three power state entries S1, S2 and S3. Top-level PST 306 depicts main driver voltages for power supplies V1 and V2, and therefore does not change during reconciliation. Because block-level PST 308 includes power supplies V1 and V2 as client supplies, the values of reconciled PST 310 differ from those of initial block-level PST 308. To reconcile block-level PST 308, for each power supply column, a voltage replacement operation is performed by replacing each client voltage level value with a corresponding list of main driver voltage levels derived from top-level (owner) PST 306. For power supply V1, the client voltage level value of 1.1V is replaced with a list of the voltage level values of top-level (owner) PST 306 (i.e., 1.3V and 1.4V). For V2, each client voltage 1.2 or 1.2 is replaced with the owner voltage level 1.5V. Once the voltage level values are updated, expansion is performed for all cells that include lists such that each power state entry cell includes only one voltage level value. Referring to final reconciled PST 312, this expansion involves expanding power state entry S1 into two reconciled power state entries S1a and S1b, with power state entry S1a including voltage level value 1.3V for power supply V1, and power state entry S1b including voltage lelel value 1.4V for power supply V1. In a more complex example, where several columns comprise lists, this may result in many new states. After expansion, the resulting power states are compared and duplicate states removed from final reconciled block PST 312. In this example, because power state entries S1a and S2a have the same voltage level values for every power supply, one duplicate is removed as shown by the strikethrough lines depicted to the right of FIG. 3. After replacing the voltages, expanding, and contracting, then the block-level PST has been reconciled.

Supply Relationships and Detection of Incompatible Relationships

As set forth above, it is important to ensure that any incompatible supply relationship is detected and displayed (or otherwise reported) for correction by a circuit designer. Herein, each pair of power supplies may have a higher/lower voltage level relationship or an on/off transition relationship, which may originally be different in each block. In one embodiment, each supply relationship may be one of two types: higher/lower voltage level relationship "A>B" (meaning that A has a higher voltage than B requiring a high to low level shifter) or "A<B" (meaning A has a lower voltage requiring a low to high level shifter), or an on/off transition relationship such as "A OFF2ON B" (also written "A→B OFF2ON"), meaning that A can be off when B is on, requiring an isolation cell. The relationships are determined by reading each line of the PST.

FIG. 4 shows an exemplary extraction and comparison of initial and final supply relationships. For the IPA PST 402, the first line of the table requires a low to high level shifter, and the second line requires isolation from V2 to V1. For the IPB PST 404, the first line requires a high to low level shifter. These original relationships are extracted before reconciliation. After reconciliation, the final relationships are extracted from the revised PST. Then the original relationships are tested against the final relationships to detect any problems. There may be two types of problems. The first type of problem is an electrical error where the final relationship has a term which was missing in the original. Since the original did not have protection against the new relationship, this may cause the design to have an electrical failure. The solid line boxes in the diagram above show this type of problem. For example, the first solid line box highlights the relationship V1>V2, requiring a high to low level shifter. However, the IPA PST 402 does not have this relationship. When the IPA PST 402 is implemented, it may not have high to low level shifters along the required paths, and the design may be electrically incorrect. All four of the solid line boxes in the diagram represent this type of electrical problem. The second type of problem is inefficiency. There may exist an original relationship, which does not exist in the final relationships. This represents protection, such as a level shifter or isolation, which is no longer needed. This circuit may still work without errors; however, as the protection is not needed, it is just wasting area, delay, and power. If possible, this protection may be removed. In FIG. 4, the dashed-line box depicts one such relationship. When the IPA PST 402 is implemented, it may have isolation on paths between V2 and V1 as required by its PST. However, in the final top level PST 406, there is no state where V2 is off, and V1 is on. This means the isolation cells implemented in IPA are not needed, and may be removed for this design. If you consider the original and final relationships as two circles in a Venn diagram, then the overlap is fine. The circle of only final relationships is the electrical error, and the circle of only initial relationships is the inefficiency warning. In the context of the overall process, extracting the original relationships happens before reconciliation, and comparing against the final relationships happens after reconciliation. This may be viewed as three steps in this order.

Reconciliation for additional supply types: Previously, supplies where ownership is easy to extract have been covered: there is one driver, such as a primary input, and other client blocks accept the voltage delivered. There are four additional types of supplies that may be covered by the reconciliation method, with increasing complexity: first, simple power switch, which either transmits the input voltage, or may be off and transmit no voltage; second, a supply net with multiple drivers, such as a parallel or one hot driver configuration; third, a voltage regulator which may have a variable input supply, but produces a constant output voltage; and fourth, a voltage regulator which may have a variable input supply, and the output voltage is a ratio of the input voltage. These additional types of supplies will be described in reference to the following examples.

Figure 5:
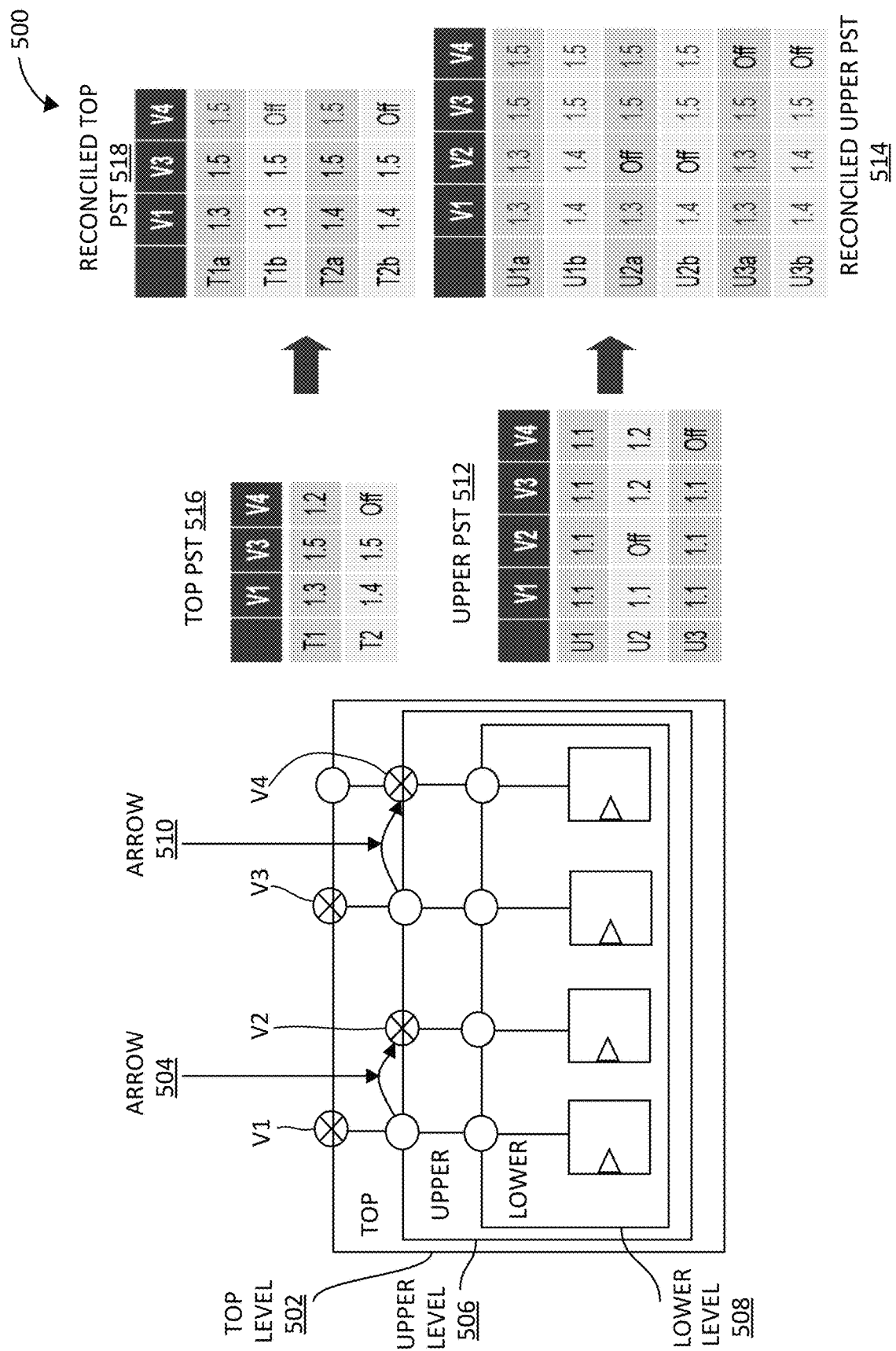
FIG. 5 illustrates an exemplary embodiment depicting supply relationships that are generated for comparison by the power state reconciliation method.

FIG. 5 depicts an example comprising two switched supplies 500 of the first (simple power switch) type mentioned above. The notation of open and crossed dots introduced in FIG. 2 depicts power supply ownership. V1 and V3 are owned by the top level 502. V2 is a simple switched supply whose input is V1, as shown by the arrow 504. V2 is owned by the upper level 506, where the power switch exists. V2 is also utilized by a lower level 508; therefore, the lower level 508 is a client of V2. For V4, the arrow 510 depicts that there is a power switch in the upper level 506, whose input is V3 and output is V4. As with V2, the lower level 508 is also a client of V4. However, the open dot for the top level 502 on V4 shows that the top level 502 is also a client of V4. In other words, the upper level 506 has a supply port V4, whose direction is output, and this supply is used in the top level 502.

For a simple power switch, the reconciliation rule is slightly more complicated. Consider V2. According to the upper PST 512, V2 can be at 1.1 when V1 is at 1.1, or it can be off. However, V2 is a client supply of the upper level 506; during reconciliation, the voltage of 1.1 is replaced with the voltages of the owner 302: 1.3 and 1.4. Now V2 may have four possible states: when V1 is 1.3, V2 can be either 1.3 or off; and when V1 is 1.4, V2 can be either 1.4 or off. These four states are included as U1a, U1b, U2a, U2b in the reconciled upper PST 514.

Consider V4, which is a simple switched supply of V3, owned by the upper level 506. In the upper PST 512, V3 can be either 1.1 or 1.2; and V4 can be either the same as V3, or off. As V3 is owned by the top level 502, reconciliation first updates V3 in the upper level 506, and replaces both 1.1 and 1.2 with 1.5. Next, reconciliation updates V4 in the upper level 506, and replaces both 1.1 and 1.2 with 1.5. But there is one more step. V4 appears as a client in the top level 502. In the top PST 516, V4 may be either 1.2 or off. After reconciliation of V4 in the upper level 506, the possible voltages are 1.5 and off. Therefore, in the reconciled top PST 518, reconciliation replaces 1.2 with 1.5. Furthermore, when expanding states, reconciliation introduces two new states into the reconciled top PST 518, as V4 may be off, independently of whether V1 is at 1.3 or 1.4.

Regarding V4, the top PST 516 itself may be changed due to reconciliation. This will happen if a top level supply is a client, specifically when a block has a supply port which is an output.

To carry this example further, FIG. 6 shows the supply relationships before and after reconciliation 600. For the original PSTs 602, there are 13 relationships. The right side of the FIG. 6 depicts the relationships which are generated from the reconciled PSTs 604. Voltage level values which are changed are indicated by dashed-line circles, compared to the original PSTs 602.

As described in an earlier section, the purpose of generating the original and final relationships is to compare them, and find (a) error cases, where a block will be missing protection, and (b) inefficiency cases, where a block has protection that is no longer needed.

Comparing the original and final relationships in FIG. 6, relationship 20, 21 in the reconciled PSTs 604 do not exist in the reconciled PSTs 604; these represent error cases. In the original upper PST 606, there was no case where the voltage on V2 would differ from the voltage of V3 and V4; no level shifters would be placed on those crossings. However, in the reconciled upper PST 610, V2 may have a different voltage and level shifters are required. Relationship 3 in the original top PST 608 no longer exists in the reconciled top PST 612; therefore, level shifters placed on crossings between V3 and V4 are now redundant and an inefficiency warning may be produced.

Figure 7:
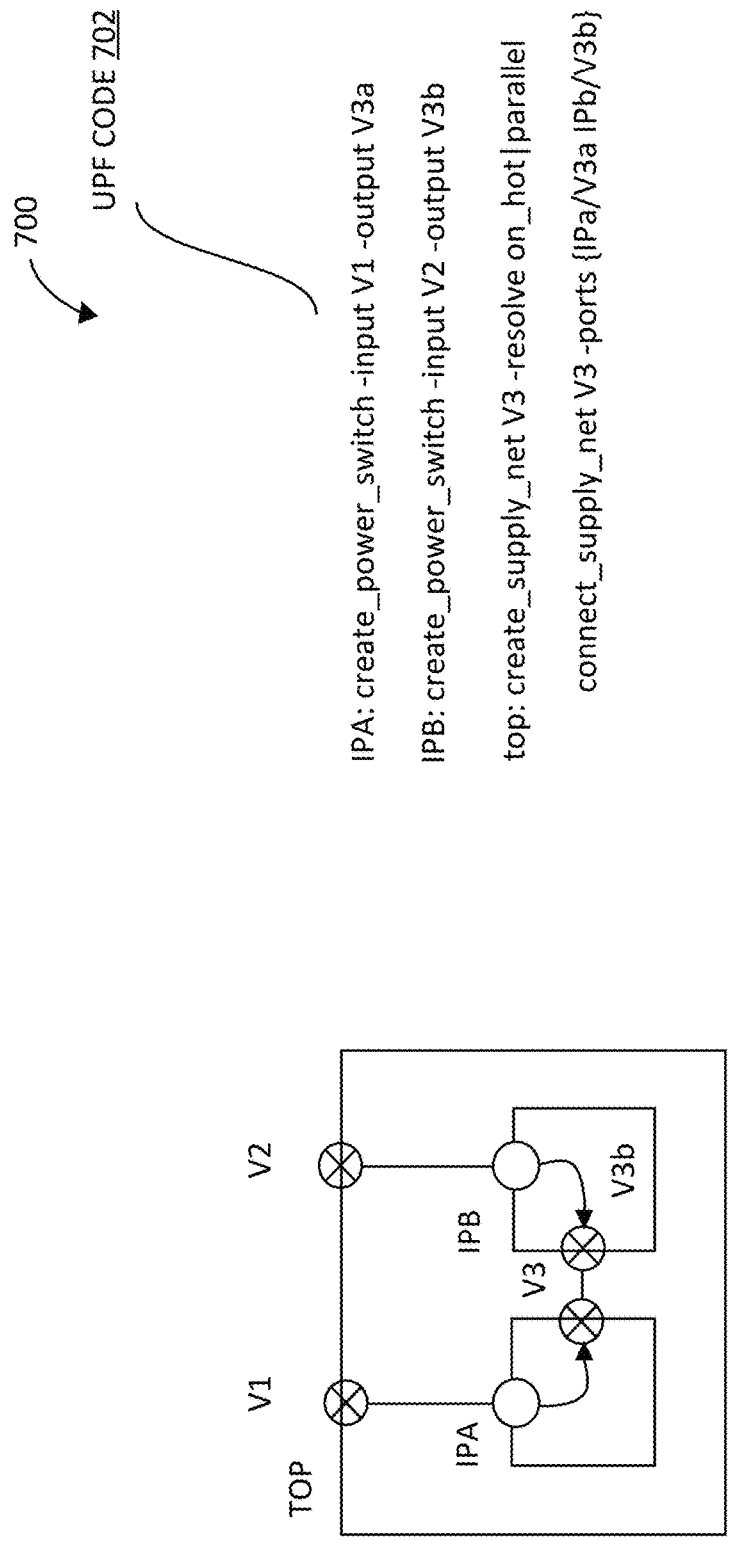
FIG. 7 illustrates another exemplary embodiment in which the power state reconciliation method is applied to an IC design having multiple drivers.

Supplies with multiple drivers: In some designs, one of the power supplies may have multiple drivers. The earlier sections have assumed that each supply has a single owner 302. This section describes how to assign ownership in cases where one of the power supplies has multiple drivers. FIG. 7 depicts the supplies with multiple drivers 700 and an example of the UPF code 702 to model it. Using the standard notation of open and crossed dots, V3 has two owners.

The syntax "-resolve parallel" indicates that both V1 and V2 are expected to be on, and driving the same voltage. The syntax "-resolve one_hot" indicates that only one of V1 or V2 may be on at a time, and the other is off. In the language definition, any power state where V1 and V2 are at different voltages may be dropped. Some tools may or may not produce error messages to highlight states that are dropped.

Without reconciliation, the voltages of V1 and V2 do not matter as voltage values are not propagated through power switches in UPF. Any power states where V3a and V3b do not match are dropped.

With reconciliation, the voltages of V1 and V2 are first reconciled through the power switches as described in an earlier section. After that, during normal UPF processing, any power states where V3a and V3b do not match are dropped.

Therefore, adding reconciliation does not affect the way that supplies with multiple drivers are modeled.

Figure 8:
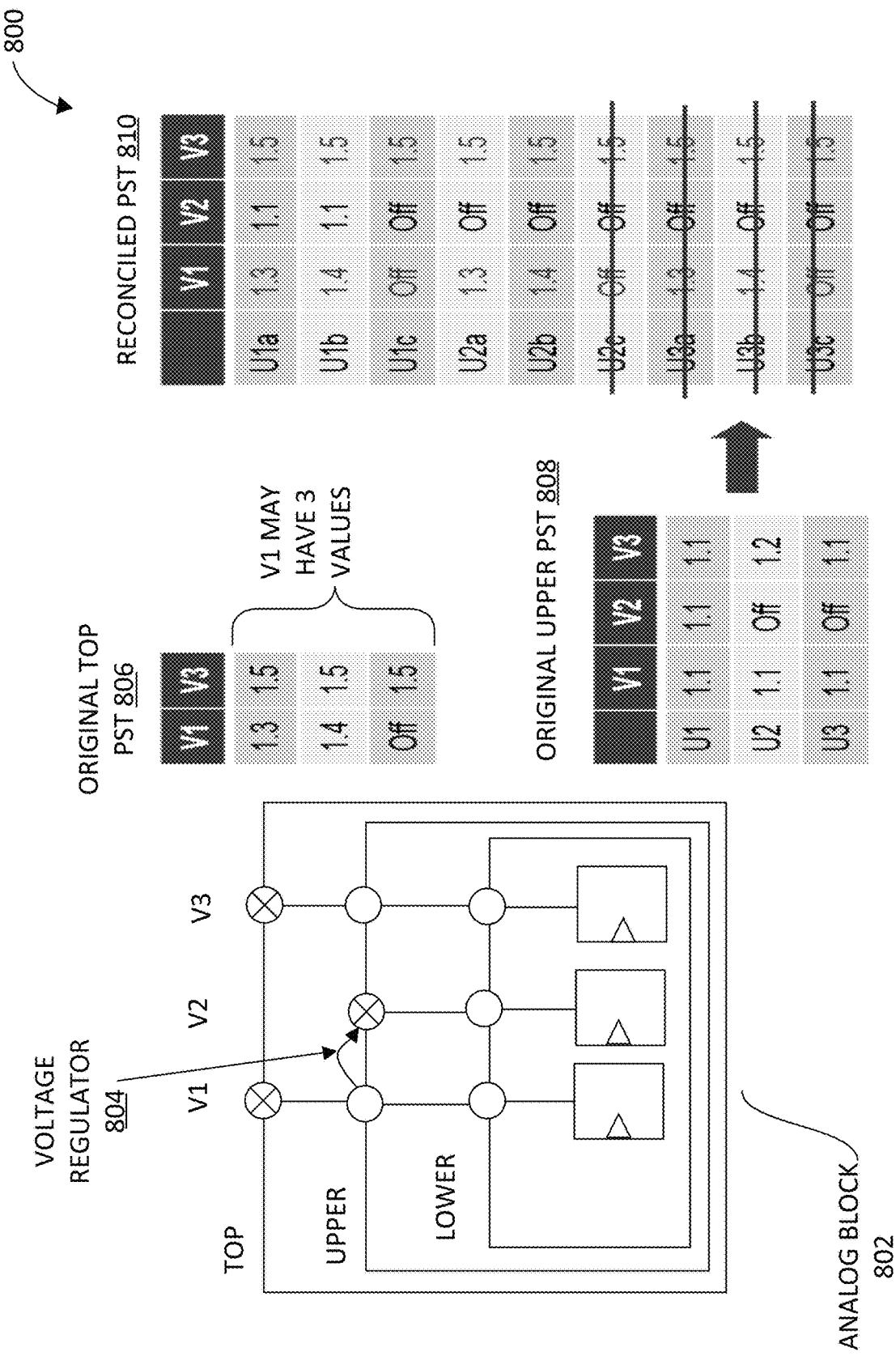
FIG. 8 illustrates another exemplary embodiment in which the power state reconciliation method is applied to an IC design having constant voltage regulators.

Constant output voltage regulators are depicted in FIG. 8. In some system-on-chip designs, an analog block 802, which generates a constant output voltage, may be included on the chip. In this case, the voltage regulator 804 has an input voltage, and an output voltage, similar to a simple power switch. If the input voltage is off, the output voltage is also off. However, if the input voltage is on, and within a certain wide range, then the output voltage is a constant voltage. One example of this type of regulator is called "LDO" or "low dropout" regulator. This section depicts how reconciliation may be applied to constant regulators.

In the UPF language, this type of regulator may not be able to be modeled. The UPF does not need to be changed to apply reconciliation to constant regulators, although one possibility is to add an -output_voltage option which declares a constant voltage for any named on state.

FIG. 8 shows an example of reconciliation for constant voltage regulators 800. The arrow depicts the voltage regulator 804 in the upper block. Its input is V1 and its output is V2. The upper block is the owner of V2. V1 and V3 are simple primary input supplies owned by the top level and are depicted in the original top PST 806. In the original upper PST 808, V2 always has the same output voltage, or it can be off. During reconciliation, the new voltages for V2 are built according to this rule: if the original input supply is off, or the output supply is off, then the new output voltage is off. Otherwise the new output voltage is the same constant, regardless of what the input voltage was. Therefore, in the reconciled PST 810, V2 remains at 1.1 even when its input voltage V1 has a different value.

Ratio voltage regulators: In some system-on-chip designs, an analog block which generates a variable output voltage may be included on the chip. In this case, the voltage regulator has an input voltage, and an output voltage, like a simple power switch. If the input voltage is off, the output voltage is also off. However, if the input voltage is on, and within a certain wide range, then the output voltage is a fixed ratio of the input voltage. Different technologies allow for the ratio to be either less than one (e.g., output voltage is 0.5 of input voltage) or greater than one (e.g., output voltage is 1.2 times input voltage). This section depicts how reconciliation may be applied to ratio regulators.

In the UPF language, this type of regulator may not be able to be modeled. The UPF does not need to be changed to apply reconciliation to ratio regulators, although one possibility is to add an -output_voltage option which comprises an expression for any named on state. For example, the output voltage VDDO may be declared using the expression "0.5*VDDI".

Figure 9:
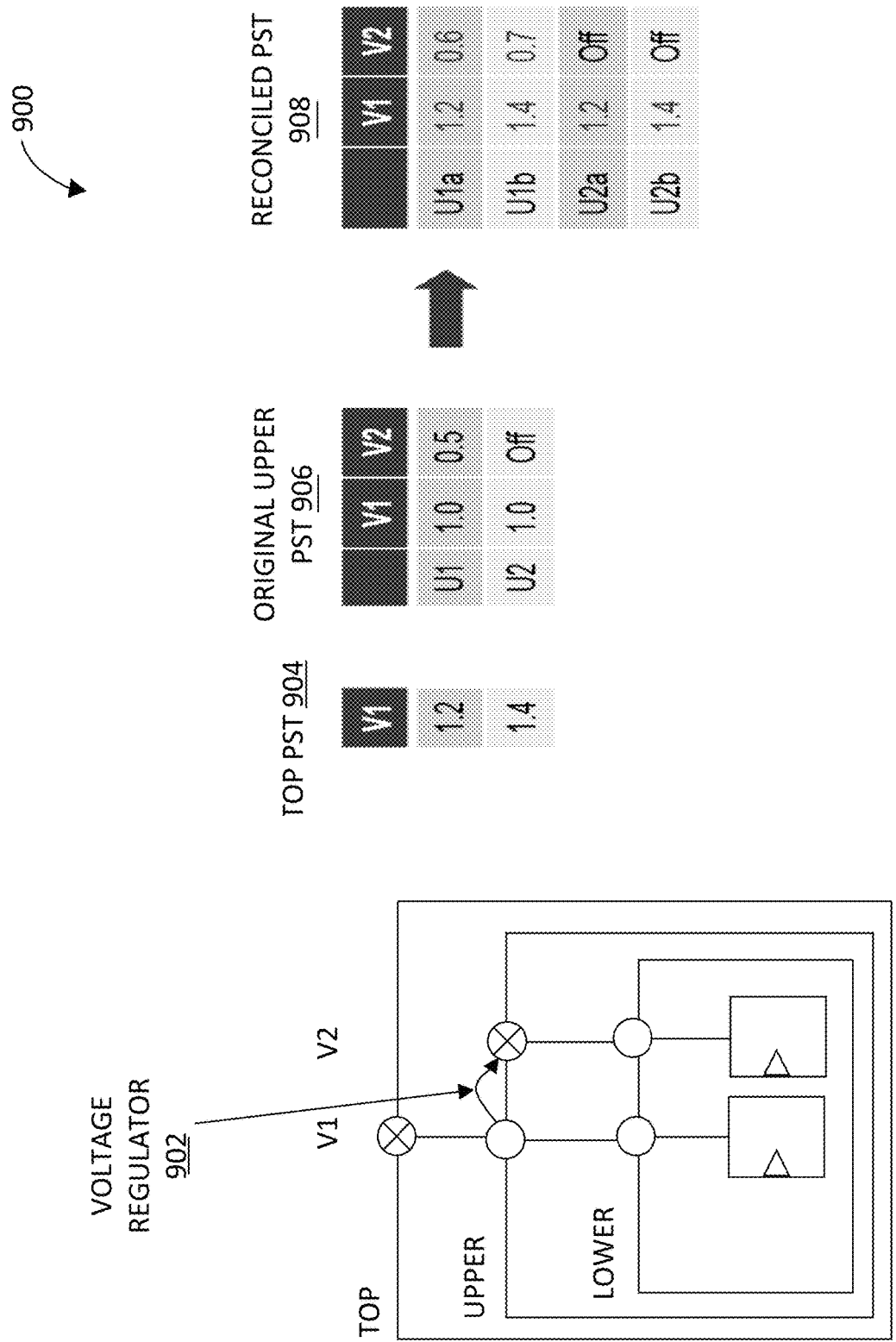
FIG. 9 illustrates another exemplary embodiment in which the power state reconciliation method is applied to an IC design having ratio voltage regulators.

FIG. 9 depicts an example of reconciliation for ratio voltage regulators 900. The arrow depicts a voltage regulator 902 in the upper block. Its input is V1, and its output is V2. The upper block is the owner of V2. V1 and V3 are primary input supplies owned by the top level and are depicted in the top PST 904. In the original upper PST 906, V2 always has the same ratio relationship to V1 (in this case 0.5×), or it may be off. During reconciliation, the new voltages for V2 are built according to this rule: if the original input supply is off, or the output supply is off, then the new output voltage is off. Otherwise the new output voltage is the same ratio of the input voltage. Therefore, in the reconciled PST 908, V2 is at 0.6 when V1 is at 1.2, and at 0.7 when V1 is at 1.4.

Figure 10:
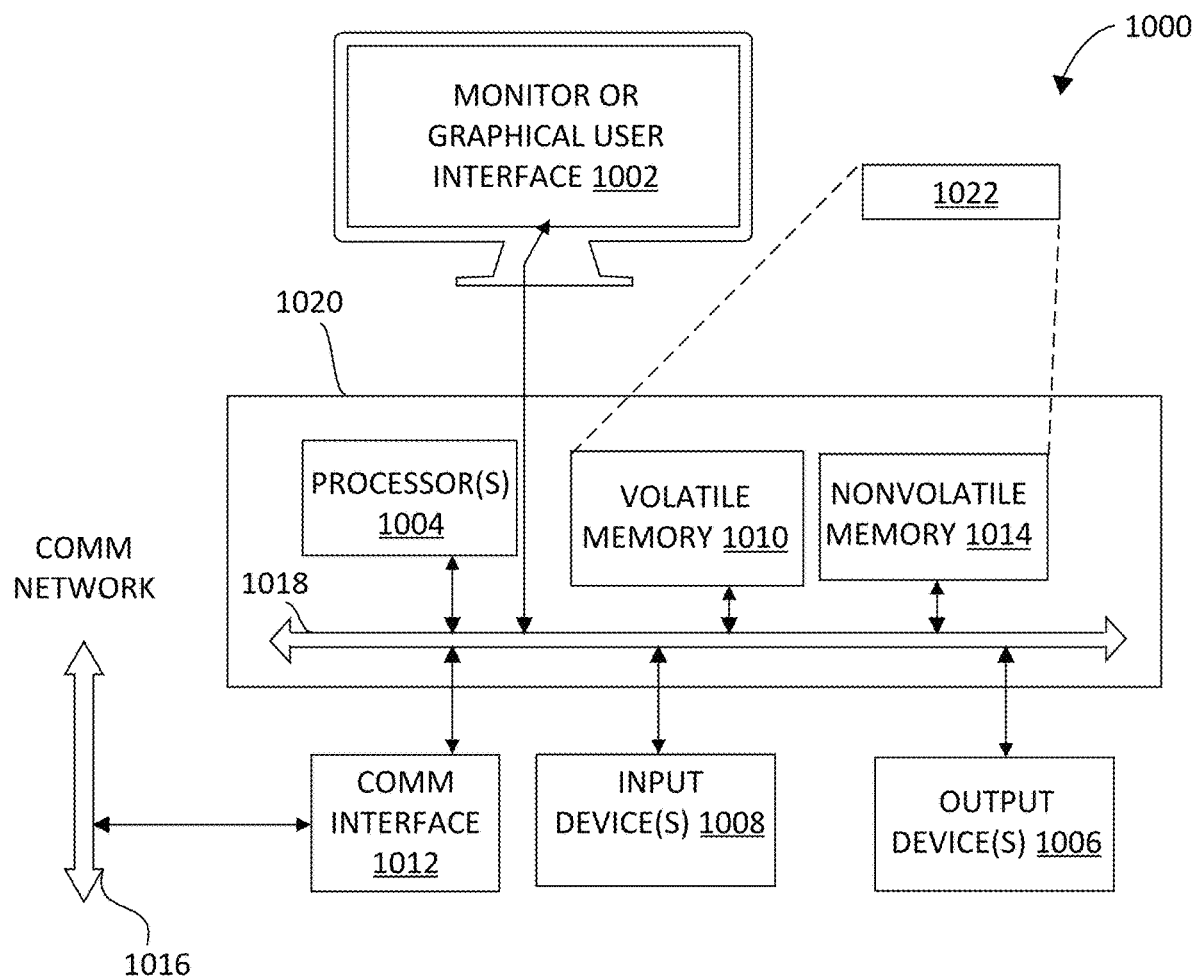
FIG. 10 is an example block diagram of a computing device that may incorporate embodiments of the present invention.

FIG. 10 is an example block diagram of a computing device 1000 that may incorporate embodiments of the present invention. FIG. 10 is merely illustrative of a machine system to carry out aspects of the technical processes described herein, and does not limit the scope of the claims. One of ordinary skill in the art would recognize other variations, modifications, and alternatives. In one embodiment, the computing device 1000 typically includes a monitor or graphical user interface 1002, a data processing system 1020, a communication network interface 1012, input device(s) 1008, output device(s) 1006, and the like.

As depicted in FIG. 10, the data processing system 1020 may include one or more processor(s) 1004 that communicate with a number of peripheral devices via a bus subsystem 1018. These peripheral devices may include input device(s) 1008, output device(s) 1006, communication network interface 1012, and a storage subsystem, such as a volatile memory 1010 and a nonvolatile memory 1014.

The volatile memory 1010 and/or the nonvolatile memory 1014 may store computer-executable instructions and thus forming logic 1022 that when applied to and executed by the processor(s) 1004 implement embodiments of the processes disclosed herein.

The input device(s) 1008 include devices and mechanisms for inputting information to the data processing system 1020. These may include a keyboard, a keypad, a touch screen incorporated into the monitor or graphical user interface 1002, audio input devices such as voice recognition systems, microphones, and other types of input devices. In various embodiments, the input device(s) 1008 may be embodied as a computer mouse, a trackball, a track pad, a joystick, wireless remote, drawing tablet, voice command system, eye tracking system, and the like. The input device(s) 1008 typically allow a user to select objects, icons, control areas, text and the like that appear on the monitor or graphical user interface 1002 via a command such as a click of a button or the like.

The output device(s) 1006 include devices and mechanisms for outputting information from the data processing system 1020. These may include speakers, printers, infrared LEDs, and so on as well understood in the art.

The communication network interface 1012 provides an interface to communication networks (e.g., communication network 1016) and devices external to the data processing system 1020. The communication network interface 1012 may serve as an interface for receiving data from and transmitting data to other systems. Embodiments of the communication network interface 1012 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 1012 may be coupled to the communication network 1016 via an antenna, a cable, or the like. In some embodiments, the communication network interface 1012 may be physically integrated on a circuit board of the data processing system 1020, or in some cases may be implemented in software or firmware, such as "soft modems", or the like.

The computing device 1000 may include logic that enables communications over a network using protocols such as HTTP, TCP/IP, RTP/RTSP, IPX, UDP and the like.

The volatile memory 1010 and the nonvolatile memory 1014 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1010 and the nonvolatile memory 1014 may be configured to store the basic programming and data constructs that provide the functionality of the disclosed processes and other embodiments thereof that fall within the scope of the present invention.

Software that implements embodiments of the present invention may be stored in the volatile memory 1010 and/or the nonvolatile memory 1014. Said software may be read from the volatile memory 1010 and/or nonvolatile memory 1014 and executed by the processor(s) 1004. The volatile memory 1010 and the nonvolatile memory 1014 may also provide a repository for storing data used by the software.

The volatile memory 1010 and the nonvolatile memory 1014 may include a number of memories including a main random access memory (RAM) for storage of instructions and data during program execution and a read only memory (ROM) in which read-only non-transitory instructions are stored. The volatile memory 1010 and the nonvolatile memory 1014 may include a file storage subsystem providing persistent (non-volatile) storage for program and data files. The volatile memory 1010 and the nonvolatile memory 1014 may include removable storage systems, such as removable flash memory.

The bus subsystem 1018 provides a mechanism for enabling the various components and subsystems of data processing system 1020 communicate with each other as intended. Although the communication network interface 1012 is depicted schematically as a single bus, some embodiments of the bus subsystem 1018 may utilize multiple distinct busses.

It will be readily apparent to one of ordinary skill in the art that the computing device 1000 may be a mobile device such as a smartphone, a desktop computer, a laptop computer, a rack-mounted computer system, a computer server, or a tablet computer device. As commonly known in the art, the computing device 1000 may be implemented as a collection of multiple networked computing devices. Further, the computing device 1000 will typically include operating system logic (not illustrated) the types and nature of which are well known in the art.

The invention claimed is:

1. A power state reconciliation method for verifying a multi-level power managed system description before the production of an integrated circuit device based on said system description, wherein said system description includes at least one Unified Power Format (UPF) design file including power states of power supplies utilized by said corresponding portions of said system circuit description, said voltage reconciliation method comprising:

generating one or more original Power State Table (PSTs) using said one or more initial UPF design files, said one or more original PSTs including a plurality of power state entries, each said power state entry including an associated set of voltage level values generated by associated said power supplies during a corresponding said power state, wherein each said voltage level value includes one of an on-state voltage level value and an off-state indicator value;

generating initial supply relationships for each pair of power supply voltage level values in each of said power state entries of said one or more original PSTs, wherein each said initial supply relationship involving first and second on-state voltage level values comprises a higher/lower voltage level supply relationship when said first on-state voltage level value is greater than said second on-state voltage level value;

generating one or more reconciled PSTs by revising stored voltage values for each power supply in each of said one or more original PSTs using one or more primary voltage values established for said each power supply, said primary voltage value being defined by a main driver of said each power supply;

generating final supply relationships for each pair of power supply voltage level values in each said power state of said one or more reconciled PSTs;

comparing each said initial supply relationships with said final supply relationships; and verifying said multi-level power managed system description only when each initial supply relationship has a matching final supply relationship and each final supply relationship has a matching initial supply relationship.

2. The method of claim 1, wherein said system description includes a top-level circuit description and one or more lower-level circuit descriptions, wherein said top level circuit description includes a top-level Unified Power Format (UPF) design file including first power states utilized by said top-level circuit description, and wherein each of said one or more lower-level circuit descriptions includes a corresponding lower-level UPF design file including second power states utilized by said each lower-level circuit description, wherein generating said original PSTs comprises:

generating an original top-level PST using said initial top-level UPF design file such that said original top-level PST includes a plurality of first power state entries, each said first power state entry including an associated set of first voltage level values generated by associated said power supplies during a corresponding said first power state utilized by said top-level circuit description; and generating one or more original lower-level PSTs, each said lower-level PST being generated using an associated said initial lower-level UPF design file, each said original lower-level PST respectively including a plurality of second power state entries, each said second power state entry including an associated set of second voltage level values generated by associated said power supplies during a corresponding said second power state each utilized by said associated lower-level circuit description.

3. The method of claim 2, wherein at least one of said lower-level circuit descriptions comprises an IP core, and wherein generating an associated said lower-level PST for said IP core comprises generating said associated lower-level PST using stored power supply states and associated voltages provided with said IP core.

4. The method of claim 2, wherein generating said initial supply relationships comprises:
generating a first initial higher/lower voltage level relationship by comparing a first on-state power supply voltage level of a first power supply in a selected first power state entry with a second on-state power supply voltage level of a second power supply in said selected first power state entry; and
generating a second initial higher/lower voltage level relationship by comparing a third on-state power supply voltage level of a third power supply in a selected second power state entry with a fourth on-state power supply voltage level of a fourth power supply in said selected second power state entry.

5. The method of claim 4, wherein generating said initial supply relationships further comprises generating a first on/off transition relationship by comparing a fifth power supply voltage level of a fifth power supply in a second selected first power state entry with a sixth off-state power supply voltage level of a sixth power supply in said second selected first power state entry.

6. The method of claim 4, further comprising designating each said power supply in said original PSTs as one of a main driver source and a client source.

7. The method of claim 6, wherein generating said reconciled PSTs comprises expanding each said reconciled PST to include additional power state entries when said reconciled PST includes a power supply having at least two primary voltage values.

8. The method of claim 7, further comprising comparing all power state entries in said each reconciled PST after said expanding, and removing duplicate power state entries from said reconciled PST.

9. The method of claim 4, wherein generating said final supply relationships comprises:
generating a first final higher/lower voltage level relationship by comparing said first on-state power supply voltage level of said first power supply in a selected third power state entry with said second on-state power supply voltage level of said second power supply in said selected third power state entry; and
generating a second final higher/lower voltage level relationship by comparing said third on-state power supply voltage level of said third power supply in a selected fourth power state entry with said fourth on-state power supply voltage level of said fourth power supply in said selected fourth power state entry.

10. The method of claim 9, wherein generating said final supply relationships comprises:
comparing said first initial higher/lower voltage level relationship with said first final higher/lower voltage level relationship, and
comparing said second initial higher/lower voltage level relationship with said second final higher/lower voltage level relationship.

11. The method of claim 10, further comprising generating an error report specifying an associated power-state combination conflict when one of:
said first initial higher/lower voltage level relationship fails to match said first final higher/lower voltage level relationship, and
said second initial higher/lower voltage level relationship fails to match said second final higher/lower voltage level relationship.

12. The method of claim 1, further comprising generating an error report specifying an associated power-state combination conflict when at least one initial supply relationship fails to match a corresponding final supply relationship or at least one final supply relationship fails to match a corresponding initial supply relationship.

13. In an electronic Design Automation (EDA) tool implemented on a computer, a method for verifying a multi-level power managed system description before the production of an integrated circuit device based on said system description, wherein said system description includes a top-level circuit description and one or more lower-level circuit descriptions, wherein said top level circuit description includes a top-level Unified Power Format (UPF) design file including first power states utilized by said top-level circuit description, and wherein each of said one or more lower-level circuit descriptions includes a corresponding lower-level UPF design file identifying second power states utilized by said each lower-level circuit description, said method comprising:
utilizing said initial top-level UPF design file and said initial lower-level UPF design files to generate a plurality of original Power State Table (PSTs), said plurality of original PSTs including an original lower-level PST Upper PST for each of said one or more lower-level circuit descriptions, and an original top-level PST for said top-level circuit description, said one or more original PSTs including a plurality of power state entries, each said power state entry including an associated set of voltage level values generated by associated said power supplies during a corresponding said power state, wherein each said voltage level value includes one of an on-state voltage level value and an off-state indicator value;
generating initial supply relationships for each said original PST, wherein each said initial supply relationship includes either a higher/lower voltage level relationship for each associated pair of said on-state voltage level values or an on-off transition relationship that is determined by stored voltage levels of two power supplies included in an associated said original PST;
generating reconciled PSTs by revising stored voltage values for each power supply in each original PST using a primary voltage value that is established for said each power supply, said primary voltage value being defined by a main driver of said each power supply;
generating final supply relationships for each said reconciled PST, wherein each said final supply relationship includes either a higher/lower voltage level relationship or an on-off transition relationship that is determined by revised voltage levels of two power supplies included in an associated said reconciled PST; and
verifying that each initial supply relationship has a matching final supply relationship and that each final supply relationship has a matching initial supply relationship by comparing said initial supply relationships and said final supply relationships.

14. The method of claim 13, further comprising generating an error message specifying an associated power-state combination conflict when one of said initial supply relationships fails to match a corresponding final supply relationship, or if one of said final supply relationships fails to match one of said initial supply relationships.

* * * * *